United States Patent

Lindstrom

[11] 3,987,627
[45] Oct. 26, 1976

[54] HYDRAULIC GOVERNOR

[75] Inventor: Harold Richard Lindstrom, Des Moines, Iowa

[73] Assignee: Deere & Company, Moline, Ill.

[22] Filed: Nov. 24, 1975

[21] Appl. No.: 634,368

[52] U.S. Cl. ............................ 60/459; 60/468; 60/494; 137/115; 137/118; 180/53 R
[51] Int. Cl.² .................... F16D 31/04; F15B 15/18
[58] Field of Search ............ 60/448, 449, 459, 468, 60/494; 137/115, 118; 180/53 R, 53 C, 53 CD, 53 D, 53 FE

[56] References Cited
UNITED STATES PATENTS

| | | |
|---|---|---|
| 904,984 | 11/1908 | Ofeldt .................................. 137/115 |
| 2,737,196 | 3/1956 | Eames ............................. 137/118 X |
| 3,163,006 | 12/1964 | Nuss et al. ............................. 60/468 |
| 3,807,427 | 4/1974 | Hogel .................................. 137/115 |

*Primary Examiner*—Edgar W. Geoghegan

[57] ABSTRACT

A hydraulic governor valve coordinates the flow of crop material to a processing unit with the rate of processing of material therein. A gear driven pump is powered by the processing unit in direct relation therewith to drive a conveyor hydraulic motor. The flow responsive governor valve diverts flow to a reservoir when the processing unit is overloaded and to the conveyor motor otherwise to coordinate delivery of crop material with processing of same.

6 Claims, 2 Drawing Figures

3,987,627

HYDRAULIC GOVERNOR

BACKGROUND OF THE INVENTION

The present invention relates generally to governor systems for agricultural implements and more particularly relates to a hydraulic governor system for regulating the speed of the feeding conveyor mechanism on a processing unit such as a hammer mill or grinder.

Existing governor systems utilized on agricultural grinders and hammer mills employ generally exposed mechanical governors relying on centrifugal force, springs, gears and/or levers. These systems are driven by the grinder or processing unit and regulate the feeding conveyor speed through activating a clutch to disengage the conveyor motor and stop the flow of material to the processing unit whenever it becomes overloaded.

Because these governor systems are exposed to the elements, foreign materials such as grain, dirt, water and ice can accumulate around and on the components, reducing the sensitivity of the governor's response and causing potential safety hazards. As the governors become less sensitive, the processing unit will more frequently overload to either cause the power source, usually a tractor, to stop running or to do damage to the implement. Such recurrent downtime caused by clearing an overloaded grinder or hammer mill or restarting an engine often causes unnecessary added expenses for the farmer. If such accumulations of foreign material do not result in stoppage of the tractor, they often make the governor response less dependable causing variations in processing efficiency.

SUMMARY OF THE INVENTION

The present invention provides an enclosed hydraulic governor system having an adjustable governor valve for coordinating a hydraulic feeding conveyor motor with the processing unit speed.

The principal object of the present invention is to provide a governor system which is sensitive to variations in the speed of the processing unit and will in response to those processing unit variations, regulate the flow of material moved by the conveyor.

Another object of this present invention is to provide an enclosed governor system having no exposed parts which are affected by accumulations of foreign material whereby the governor's effectiveness is diminished.

A further object of the present invention is to provide a governor system having means for adjusting the sensitivity of governor response to the processing unit speed variations.

Yet another object of the present invention is to provide a governor system which is adaptable to various agricultural applications, and will coordinate the speed of the respective feeding mechanisms in response to the processing capability of the processing units.

DESCRIPTION OF THE PREFERRED EMBODIMENT

Figure 2:
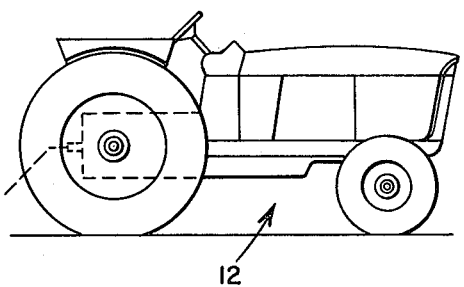
FIG. 2 is a schematic illustration of the adjustable hydraulic governor valve utilized in the present invention.

Referring now to the drawings and particularly to FIG. 2, it will be noted that according to the present invention there is included a processing unit or hammer mill 10 powered by a tractor 12 PTO, a feeding conveyor mechanism 14 secured to the processing unit, a hydraulic fluid reservoir 16, a hydraulic pump 18 driven by the processing unit 10, a hydraulic motor 20 drivingly secured to the feeding conveyor 14, and a governor valve 22 inserted into the fluid line between the pump and hydraulic motor.

The processing unit 10 illustrated in the present embodiment is a hammer mill, but the invention could be utilized with any processing unit which requires the flow of material to be processed to be coordinated with the processing unit 10 speed. While a tractor 12 PTO drivingly powers the hammer mill 10 in the present embodiment, any suitable power source could be utilized.

A hydraulic fluid reservoir 16 provides the fluid supply for the fixed displacement gear driven hydraulic pump 18 driven by the processing unit drive train 24. This pump 18 includes an inlet conduit means 26 connected with the fluid reservoir 16 and a fluid outlet conduit means 28 connected with the valve 22.

Figure 1:
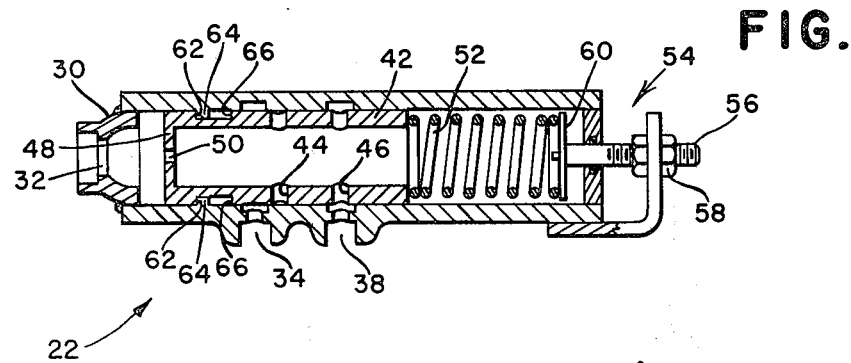
FIG. 1 is a diagrammatic illustration of the governor system according to the present invention.

A flow responsive valve means or governor valve 22 is inserted into the pump outlet conduit means 28 and regulates the speed of the hydraulic motor 20 in accordance with the rate of hydraulic fluid flow from the pump 18. As best illustrated in FIG. 2, the valve 22 includes a pressure chamber 30 having an inlet means 32 coupled with the pump outlet conduit means 28, a first outlet means or port 34 including conduit means 36 connecting the first outlet means 34 with the fluid reservoir 16, and a second outlet means or port 38 including conduit means 40 connecting the second outlet means 38 with the hydraulic motor 20. A flow responsive valve member or element 42 is slidably positioned within the pressure chamber 30 and includes a first 44 and second outlet 46 and an end face 48 including an orifice 50 therein. A biasing means or spring 52 is also positioned within the chamber 30 abutting on its one end the slidable valve member 42 and on its other end a means 54 for adjustably varying the force exerted by the spring 52. The spring 52 can be adjustably compressed by rotating the screw 56 carried by the chamber 30 such that the plate 60 and end of spring 52 are moved leftwardly as viewed in FIG. 1.

In operation the processing unit drive train 24 is connected with a tractor 12 PTO shaft or other suitable source of power and the gear driven fixed displacement pump 18 is drivingly coupled with the processing unit drive train 24 to pump in direct relationship to the unit's 10 rate of rpm. Thus as the processing unit's 10 rpm increases or decreases, the hydraulic pump 18 flow rate will be proportionately increased or decreased.

After the processing unit 10 has been connected to the tractor 12 PTO shaft and the tractor 12 engine started, the pump 18 will be driven by the unit's 10 drive train 24 to move hydraulic fluid from the fluid reservoir 16, through the pump 18 and to the governor valve chamber inlet means 32. The fluid will flow through the inlet 32 and exert on the valve element face 48 a pressure tending to shift the valve element 42 to the right when viewed as illustrated in FIG. 2. As fluid passes through the valve element orifice 50, a pressure drop on the downstream side of the face 48 will be created tending to cause the valve element 42 to be shifted to the right whereupon one set of outlets will be aligned, permitting fluid flow through the valve and to either the reservoir or the motor.

When the processing unit 10 is operating at maximum rpm, the fluid flow throughout the governor system will be at a maximum. Accordingly, the fluid pressure created by the pump 18 and exerted against the valve element face 48 will be sufficient to overcome the force created by the biasing means 52. Thus the valve element 42 will be shifted to the right until the valve surface 62 abuts the chamber stop 64 and the valve second outlet 46 is aligned with the chamber second outlet means 38, permitting fluid to flow to the hydraulic motor 20. With the pump operating at maximum rate and the fluid flow at a maximum, the hydraulic motor 20 will be powered to drive the conveyor 14 accordingly.

Occasionally the processing unit 10 will not be capable of processing the material received from the conveyor 14 as fast as it is moved to the processing unit. In such cases the unit 10 may become overfilled, causing the tractor 12 engine to lug down or die. To avoid the downtime resulting when the tractor 12 engine dies, the conveyor 14 feed rate should be reduced until the processing unit 10 has been able to process the material delivered to it.

With the present invention, the reduction in processing unit rpm occasioned by an overloaded mill will reduce the drive train 24 rpm and correspondingly the pump 18 output rate. The fluid flow through the governor valve orifice 50 will be reduced and a pressure drop across the valve element face 48 will be realized. With the pressure drop, the force exerted by the spring means 52 against the valve element 42 will be sufficient to overcome the fluid pressure and the valve element 42 will be shifted to the left whereat the valve surface 66 will abut the chamber stop 64 aligning the chamber first outlet means 44 with the valve first outlet 34. In this position the fluid flow will now be directed back through line 36 to the reservoir 16 rather than through the motor 20. With the fluid flow diverted, the flow of material to the processing unit 10 will be stopped as the motor 20 and conveyor 14 are stopped.

As the processing unit 10 continues to operate and the material therein is processed, the unit's 10 rpm will increase and the rpm of the gear driven pump 18 will increase. The fluid flow will thereby be increased causing the valve element 42 to be shifted to the right once again and the conveyor 14 motor to be again started. The flow of crop material will continue to the processing unit 10 at full speed until the unit again becomes overloaded and the conveyor motor 20 is again shut down.

To adjust the force exerted by the spring 52 on the valve element 42, the screw 56 can be advanced by rotating the nut 58 to move the plate 60 against which the spring 52 abuts. This adjusting means 54 permits the operator to adjust the spring 52 force for best results over a particular tractor or fluid viscosity operating range.

I claim:

1. In a farm implement, a hydraulic governor apparatus for coordinating the speed of a feeding mechanism hydraulic motor with the processing rate of a processing unit, comprising: a hydraulic fluid reservoir; a fixed displacement hydraulic fluid pump driven by the processing unit in a fixed relationship therewith, and having an inlet conduit means connected with the fluid reservoir and an outlet conduit means connected with the hydraulic motor; a flow responsive valve means for regulating the flow of hydraulic fluid to the motor, interposed in the pump outlet conduit means between the pump and motor, and having an inlet means coupled with the pump outlet conduit means, a first outlet means including conduit means connecting the first outlet means with the fluid reservoir, a second outlet means including conduit means connecting the second outlet means with the hydraulic motor, and a movable valve member responsive to fluid flow through the inlet means to move in a direction to operatively interconnect the pump outlet conduit means and the hydraulic motor when the flow rate is above a predetermined value; and a biasing means normally urging said valve member in the opposite direction to operatively interconnect the pump outlet conduit means and the fluid reservoir when the flow rate is below a predetermined value.

2. The invention defined in claim 1 wherein the fixed displacement pump is a gear driven pump powered by the drive train of the processing unit.

3. The invention defined in claim 1 wherein the pump is driven in a direct proportional relationship to the speed of the processing unit.

4. The invention defined in claim 1 wherein the biasing means includes means for adjustably varying the force urging the valve member.

5. The invention defined in claim 4 wherein said means for adjustably varying the force urging the valve member includes a plate abutting the biasing means and screw means for variably positioning said plate to compress said biasing means.

6. In a farm implement, a hydraulic governor apparatus for coordinating the speed of a feeding mechanism hydraulic motor with the processing rate of a processing unit, comprising: a hydraulic fluid reservoir; a gear driven fixed displacement pump driven by the processing unit in fixed relation to the processing rate thereof, said pump having an inlet conduit means connected with the fluid reservoir and an outlet conduit means connected with the hydraulic motor; a flow responsive valve means for regulating the hydraulic motor speed, said valve means interposed in the pump outlet conduit means between the pump and the motor, and having a valve pressure chamber including an inlet means coupled with the pump outlet conduit means, a first outlet means including conduit means connected with the fluid reservoir, a second outlet means including conduit means connected with the hydraulic motor, and a flow responsive valve element slidably positioned within said pressure chamber and having a first and second outlet, said element being responsive to chamber inlet fluid pressure to move in a direction to operatively interconnect the pump outlet conduit means and the hydraulic motor when fluid pressure from said pump is above a predetermined value; biasing means in said pressure chamber, normally urging the valve element in the opposite direction to operatively interconnect the pump outlet conduit means and the fluid reservoir when fluid flow in said chamber is below a predetermined value; and means for adjustably compressing the biasing means to vary the fluid flow value below which the valve element interconnects the pump outlet and the fluid reservoir.

* * * * *